United States Patent [19]

Thurber et al.

[11] Patent Number: 4,768,035

[45] Date of Patent: Aug. 30, 1988

[54] COHERENT RADAR DIGITAL DATA COLLECTOR AND SAMPLING TECHNIQUE FOR NONCOHERENT TRANSMITTER RADARS

[75] Inventors: Robert E. Thurber, Glenn Dale; Richard J. Prengaman, Severna Park; Joe Phipps, Westminster; Russell Rzemien, Hanover, all of Md.

[73] Assignee: The Johns Hopkins University, Baltimore, Md.

[21] Appl. No.: 724,850

[22] Filed: Apr. 18, 1985

[51] Int. Cl.[4] ................................................ G01S 7/40
[52] U.S. Cl. .................................... 342/194; 342/173; 342/160
[58] Field of Search ............... 343/5 DP, 5 NQ, 7 A, 343/7 PL, 7.7; 342/104, 115, 160–164, 194, 195, 173, 174

[56] References Cited

U.S. PATENT DOCUMENTS

| | | | |
|---|---|---|---|
| 3,972,041 | 7/1976 | Howard | 343/7.7 |
| 3,987,442 | 10/1976 | McLeod, Jr. | 343/7.7 |
| 4,011,438 | 3/1977 | Aufderheide et al. | 343/7.7 X |
| 4,040,055 | 8/1977 | Donahue et al. | 342/174 X |
| 4,132,990 | 1/1979 | DiDomizio et al. | 343/7 A |
| 4,153,899 | 5/1979 | Taylor, Jr. | 343/7.7 |
| 4,293,856 | 10/1981 | Chressanthis et al. | 343/5 CF |
| 4,394,658 | 7/1983 | Short, III | 343/7.7 |
| 4,484,194 | 11/1984 | Arvidsson | 343/17.7 |
| 4,488,154 | 12/1984 | Ward | 343/9 R |
| 4,489,392 | 12/1984 | Lewis | 364/724 |
| 4,584,710 | 4/1986 | Hansen | 342/174 X |
| 4,626,856 | 12/1986 | Pierson et al. | 342/174 |
| 4,635,060 | 1/1987 | Mertens | 342/173 X |

*Primary Examiner*—Theodore M. Blum
*Assistant Examiner*—Bernarr Earl Gregory
*Attorney, Agent, or Firm*—Robert E. Archibald; Carl I. Brundidge

[57] ABSTRACT

A Radar Digital Data Processor has been developed which produces I (phase) and Q (quadrature) data obtained by sampling the receiver IF of a radar with a single A/D converter. A sampling technique was developed for this application to allow operation with radars employing a noncoherent transmitter such as a magnetron. Representative field results are presented employing spectral analysis proving the viability of the sampling technique for Doppler processing.

4 Claims, 4 Drawing Sheets

COHERENT RADAR DIGITAL DATA COLLECTOR AND SAMPLING TECHNIQUE FOR NONCOHERENT TRANSMITTER RADARS

STATEMENT OF GOVERNMENT INTEREST

The Government has rights in this invention pursuant to Contract No. N00024-83-C-5301, awarded by the Department of the Navy.

BACKGROUND OF THE INVENTION

Doppler processing has been applied extensively in shipboard, land based and airborne radars for the improvement of signal-to-clutter ratios and the estimation of target radial velocity. (See U.S. Pat. Nos. 4,484,194 and 4,489,392). For radars with fully coherent exciter and transmitter stages, digital Doppler processing is typically achieved through quadrature phase detection, A/D conversion and vector processing. However, the implementation of Doppler processing in radars utilizing noncoherent transmitter (such as a magnetron) is more complex since the pulsed oscillator transmitter produces a random phase on each pulse. This aspect has limited the application of Doppler techniques in several important classes of radars, including shipboard surface surveillance radars, coastal surveillance radars and ship collision avoidance radar systems. By using the latest advances in high speed conversion and digital timing circuits, a simpler method of extracting Doppler data from noncoherent systems is proposed in accordance with the present invention, making Doppler processing for these systems more cost effective.

Doppler processing of radar data is accomplished by taking the data for several consecutive transmissions and filtering the data to enhance the range samples that exhibit a phase change caused by the Doppler effect of a moving target. According to this prior technique, the amplitude and phase of a given range cell must be precisely measured for several radar transmissions, which implies that the exact amplitude and phase of the transmitted pulse of energy is known. For radars which use a pulsed high power oscillator as a transmitter, this is not the case. The amplitude is well controlled but the phase of the transmitted signal is random from transmission to transmission.

In the past, Doppler processing for this type of radar involved the use of a device called a COHerent Oscillator (COHO), which is a stable oscillator at the radar IF, that is phase locked to the transmitted signal every transmission. A COHO circuit is illustrated in the Prior Art circuit of FIG. 1. The COHO output is used to translate the IF return signal to In-phase (I) and Quadrature (Q) base band signals where they are amplified and converted to digital words for filtering by the Moving Target Indicator (MTI) filer. Examples of typical MTI filters are found in U.S. Pat. Nos. 4,153,899; 4,293,856; and 4,394,658. The performance of the system is limited by the stability and balance of the COHO and associated quadrature video processing and conversion circuits (not shown, but see U.S. Pat. No. 4,488,154). To obtain adequate data for separating true moving targets from clutter these circuits are complex and costly.

The performance of any Doppler processing system is limited by the accuracy to which the amplitude and phase of the data is measured. This determines to what extent the clutter signals can be separated from targets containing Doppler and this can be expressed as decibels of clutter attenuation.

SUMMARY OF THE INVENTION

The present invention concerns a radar digital data processor which produces in-phase (I) and quadrature (Q) data by sampling the receiver IF of a radar with a single A/D converter, allowing operation with a radar having a noncoherent transmitter (such as a magnetron). In accordance with the invention, I and Q data are developed by taking two samples of the IF which are separated 90 electrical degrees relative to each other, for every range resolution cell at the system information bandwidth. The successive sample pairs are separated by the reciprocal of the information bandwidth. Emitter Coupled Logic circuits, of a detector circuit, A/D timing circuit and system timing circuit, form a control loop to precisely phase lock a stable oscillator to a sample of a transmitter pulse to establish coherence. The I and Q samples enter a moving target indicator directly for Doppler processing. Thus, the need for coherent IF and quadrature video processing are eliminated, as are two channel stability requirements.

DETAILED DESCRIPTION

Figure 1:
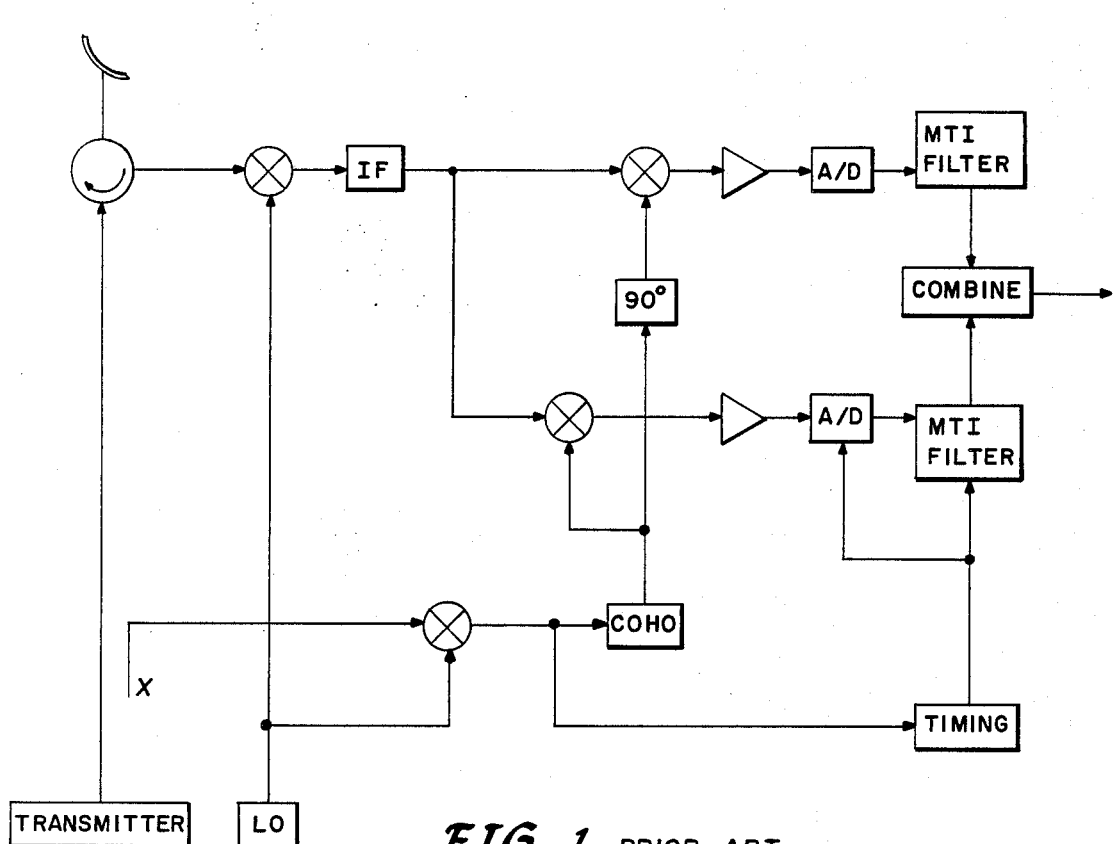
FIG. 1 shows a prior art coherent on-receive system.
Figure 2:
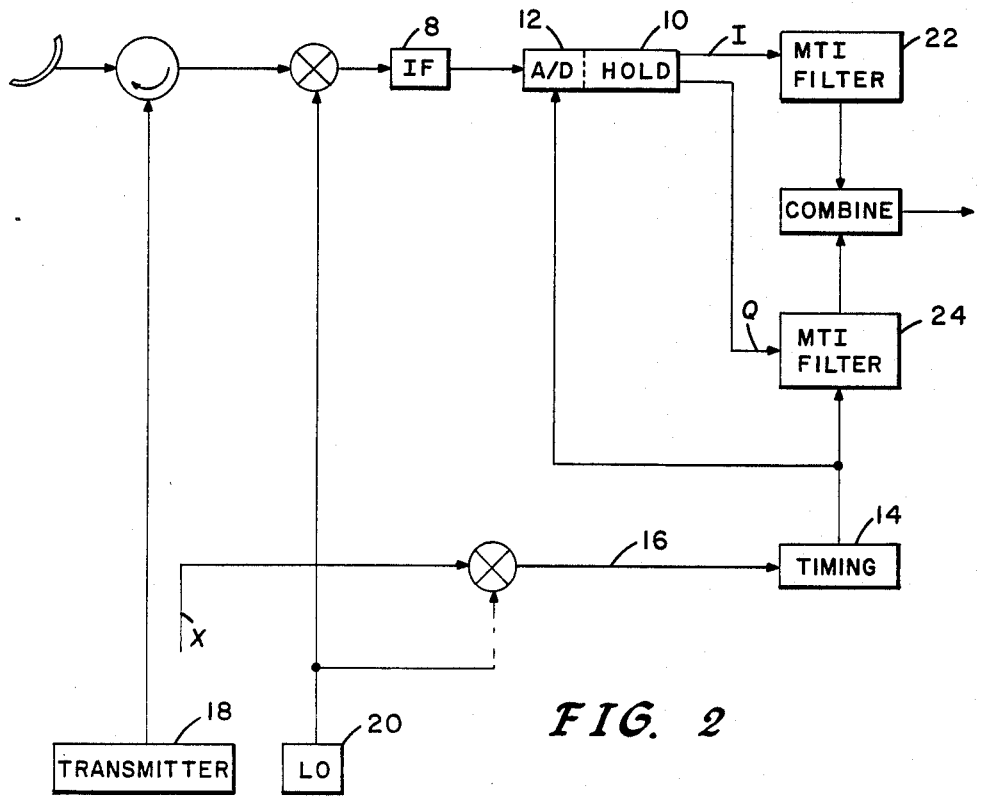
FIG. 2 shows a semi-coherent Doppler processing circuit according to the present invention.

By utilizing the technique and apparatus according to the invention, the need for a COHO and quadrature video processing circuits can be eliminated. See FIG. 2. Extremely small aperture time (<30 picoseconds) sample and hold circuits 10, e.g., as produced by TRW, Inc., are included in high speed (>30 megahertz) analog to digital converter 12, which in response to timing signals precisely phase locked to the transmitted pulse of a radar system makes it possible to sample the return signals at the varying radar IF 8 and convert them to digital words for filtering without going through the quadrature video processing step. The data is developed by taking two samples of the IF signal, separated by 90 electrical degrees. These sample pairs are taken for every radar range resolution cell of a pulsed radar system. Thus, data is acquired at the system information bandwidth and all data is available for Doppler processing. For the specific examples of data presented below, the IF was 15 MHz and successive I and Q samples were separated by 1 $\mu$s (the reciprocal of the information bandwidth).

To establish coherence, the sample clocks and any other timing sensitive component must be precisely phase locked to the transmitted signal. This is accomplished within A/D and system timing circuits 14 and 17 respectively by using very high speed Emitter Coupled Logic (ECL) circuits (known, per se) including a detector circuit 15 to form a control loop to phase lock stable oscillators (not shown, part of system and A/D circuits 17 and 14 respectively) to a sample of the transmitted pulse 16, which is formed by combining signals of a transmitter 18 and local oscillator 20. Locking accuracies of less than 100 picoseconds have been achieved.

Timing signals from the A/D timing circuit 14 are supplied to the sample and hold circuit 10 and to the A/D converter 12 and timing signals from the system timing circuit 17 are supplied to MTI filters 22 and 24. As stated above, the timing signals are supplied to the sample and hold circuit 10 cause the sample and hold circuit to sample the IF signal at two points separated by 90 electrical degrees capturing I and Q data samples. The I and Q data samples are temporarily held by the sample and hold circuit and then provided to the A/D converter 12. A timing signal from the A/D timing circuit 14 initiates the analog to digital conversion process converting the I and Q data samples to digital values.

The in-phase and quadrature digital samples thus derived are input directly into two MTI filers 22, 24 for Doppler processing. Timing signals supplied to the MTI filters 22 and 24 regulate the Doppler processing. This technique has eliminated all coherent IF and quadrature video processing and replaced it with one high speed A/D conversion device and precision phase locked timing circuits. Two channel stability requirements for keeping the system balanced are completely eliminated.

The semi-coherent processing technique is limited by the accuracy to which the sample stable oscillators of the system timing circuit 17, and the A/D timing circuit 14 is phase locked to the transmitted signal 16 and by the time jitter between the non-simultaneous I and Q samples. This is in addition to the quantization accuracy and amplitude stability of the system plus environmental effects, all of which are common to every Doppler processor. For typical radar receiver parameters the accuracy obtained from the timing circuits 14 and 17 permits clutter attenuation in excess of 50 dB, which is not an inherent limitation of this technique.

Figure 3A:
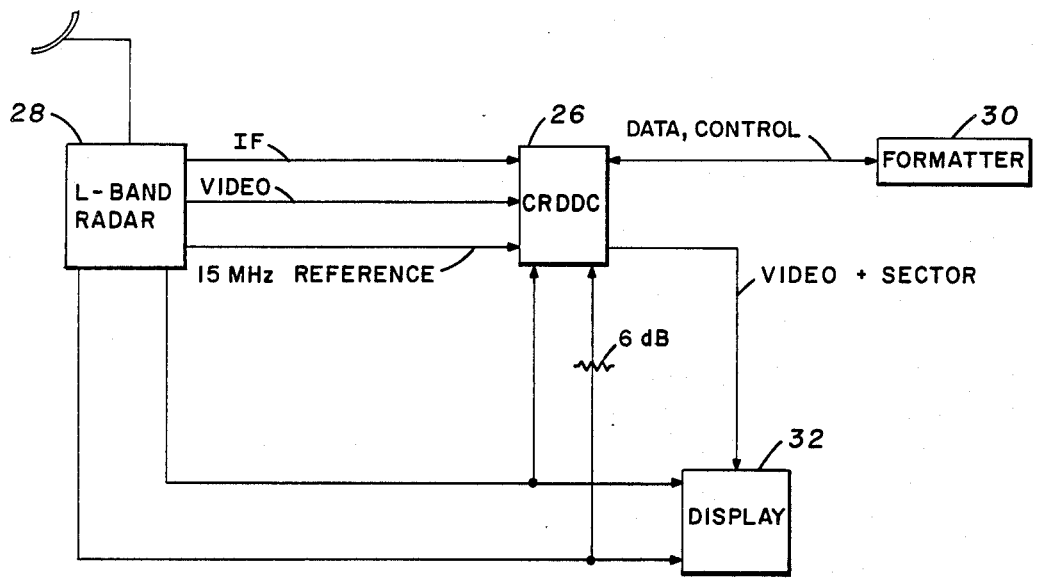
FIG. 3a shows a Coherent Radar Digital Data Collector (CRDDC) with associated instrumentation.

A system 26, for processing the quadrature and in-phase signals is presented in FIG. 3a. The CRDDC 26 was used to record data from an L-Band, fan-beam surveillance radar 28. The CRDDC 26 takes the radar IF and a 15 MHz reference signal for locking the sampling timing and producing In-phase (I) and Quadrature (Q) digital data for every radar resolution cell. In order to analyze this data a recording formatter 30 was built into the processor. Since there are several million data samples in every radar scan, the data volume was limited for recording in the formatter 30. This was done by setting up a "window" for data collection which can be placed around returns of interest (targets, land, sea, etc.). Examples of radar data "windows" are taught in U.S. Pat. Nos. 3,972,041, 3,987,442, 4,132,990, and 4,394,658.

The resultant collection of data effort verified the performance of the CRDDC and provided a data base of coherent radar data for analysis, as discussed below. The region over which data was to be recorded was chosen by viewing a movable section on the standard radar display 32. The size and location of the window are variable.

Figure 3B:
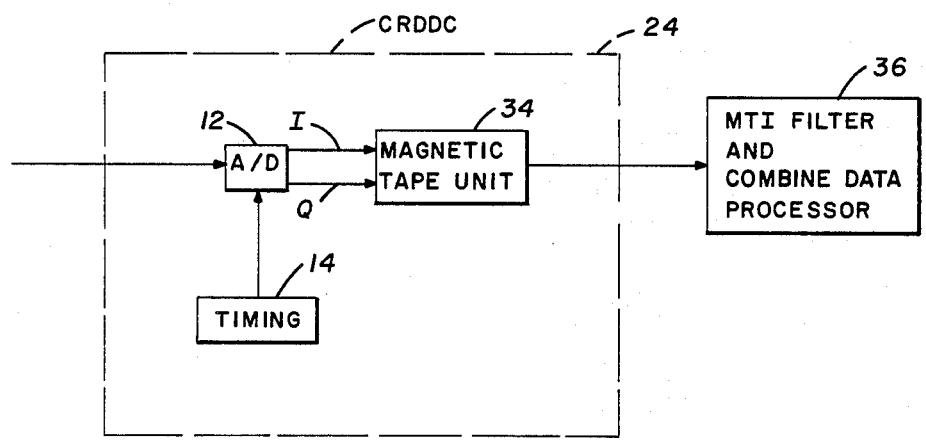
FIG. 3b shows the components of the CRDDC.

FIG. 3b shows the details of the CRDDC, including the A/D converter 12 and A/D timing circuit 14. Here, however, the I and Q data was recorded in a magnetic tape unit 34. The data was then analyzed by data processor 36, where the functions of the MTI filter, and combine circuits 22, 24 were mathematically represented (the data being mathematically filtered and combined by the processor 36.

In order to verify the coherence of the recorded data and obtain a measure of the coherent processing gain the data collected was spectrum analyzed with a Fast Fourier Transform (FFT) algorithm. $N = 2^m$ points were used in bearing at the same range cell in the FFT processing with successive FFTs jumping by N/2 points to allow 50% overlap. This FFT processing was performed at each range cell within the limits defined by the recording window. For the L-Band radar parameters, a 32 point FFT (i.e., N=32, m=5) was appropriate. A 32 point FFT yielded a Doppler resolution of approximately $6\frac{1}{2}$ knots with ambiguities separated by 205 knots. Hamming weighting was employed so that the FFT filter sidelobes are down by about 43 dB from the peak value when quantization effects are negligible. Therefore, the power $P_n$ measure in dB at the output of the $n^{th}$ Doppler filter of the FFT filter bank is computer as:

$$P_n = 10\log_{10} A_n A_n^* = 20\log_{10} |A_n|$$

$$A_n = \sum_{k=0}^{N-1} (I_k + iQ_k)W_k \exp\left(-i\frac{2\pi nk}{N}\right); n = 0, 1, 2, \ldots, (N-1)$$

$$W_k = .54 - .46\cos(2\pi k/N); k = 0, 1, 2, \ldots, (N-1)$$

where n is the filter number, $W_k$ are the Hamming weights and $I_k$, $Q_k$ are the corresponding I, Q samples.

Figure 4:
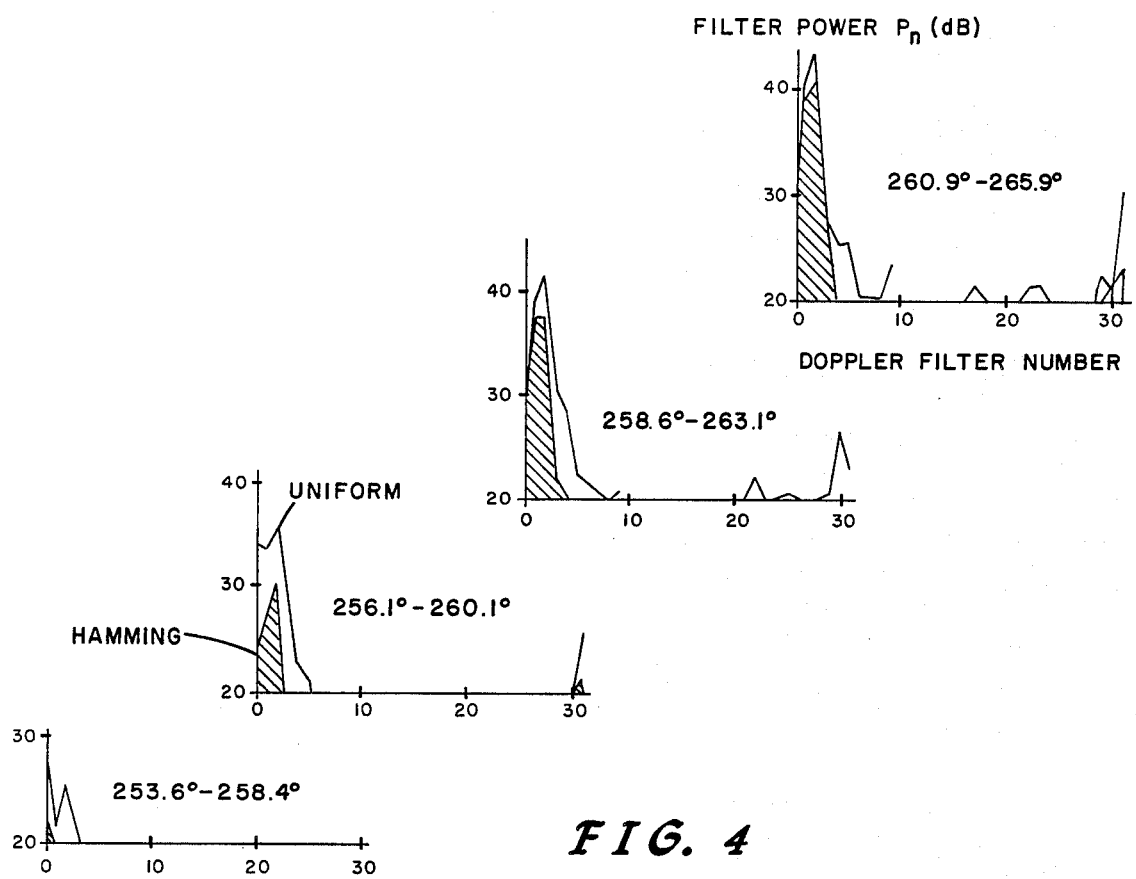
FIG. 4 charts typical radar data for an outbound ship.

FIG. 4 is the spectrum analyzed coherent data obtained during one radar scan for a ship target in a range resolution cell 22 of the recording window. The actual target range is about 10.8 nm. Note the amplitude modulation between successive FFT blocks due to the radar antenna pattern. Using the filter numbers 0–31 along the x-axis, for this 32 point FFT case, we see a maximum response in the number 2 Doppler filter indicating a 13-knot radially outbound velocity component. By comparing the change in slant range versus time for the target with the Doppler filter number it can be ascertained that the first ambiguous Doppler interval for the lower number filters approximately corresponds to 0 to 100 kts. outbound while the higher filters correspond to $-100$ to 0 kts. inbound. These responses are ambiguous with an ambiguity interval of about 200 kts. Noting that this response is straddling adjacent filters 1 and 2 it can be determined via amplitude information that the range rate is 10 kts. outbound which is in good agreement with R/t.

Figure 5:
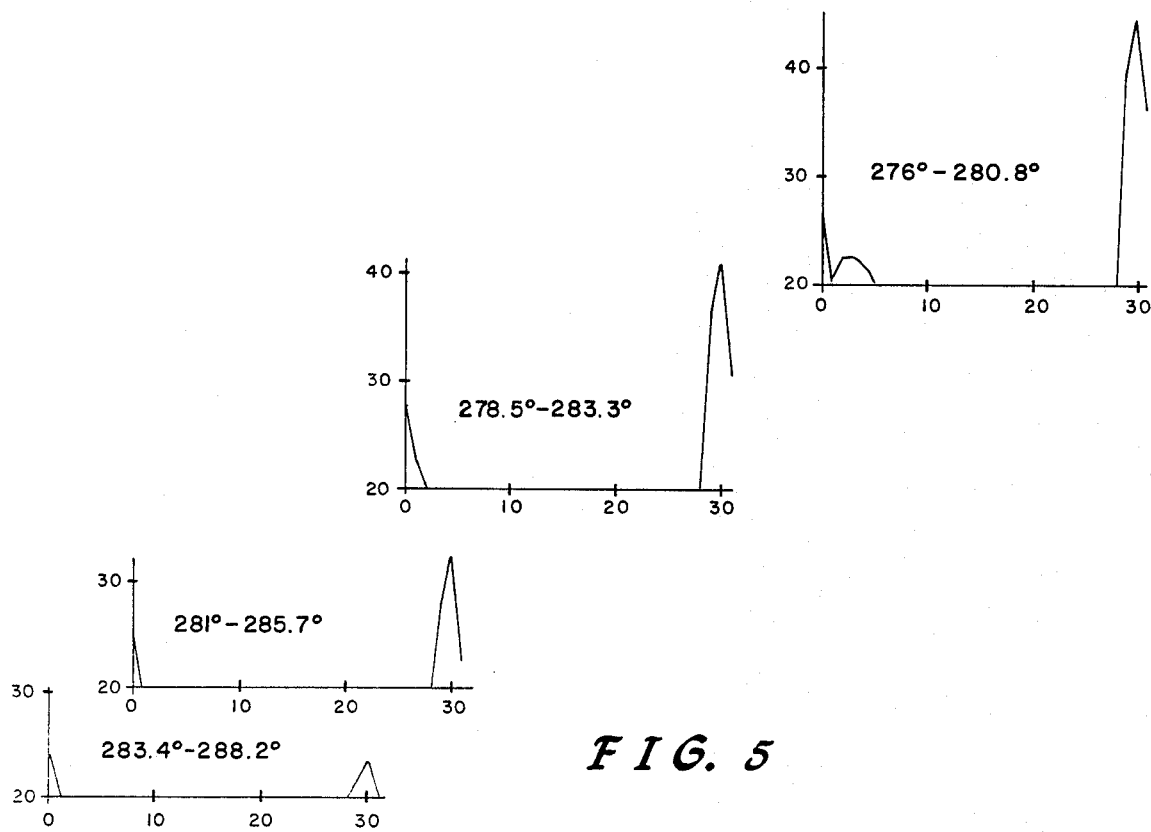
FIG. 5 charts typical radar data for an inbound ship.

FIG. 5 is the spectrum analyzed coherent data for an inbound ship at 10.3 nm. The maximum response is in the 30th filter indicating that this ship's radial rate is about 12 kts. inbound. Estimating radial rate with R/t measured between several scans corroborated this result. The response in the zero filter of about 25 dB is an artifact created by the fact that in the absence of signal (I,Q) prefers to be (0,1). The A/D used for the application was an 8-bit device, including sign, so that I and Q values could vary over the range ±127. This is a characteristic of the A/D converter. Notice the spectral purity of these responses except for a few sidelobes between bearings of 273.4° and 278.3°.

Figure 6:
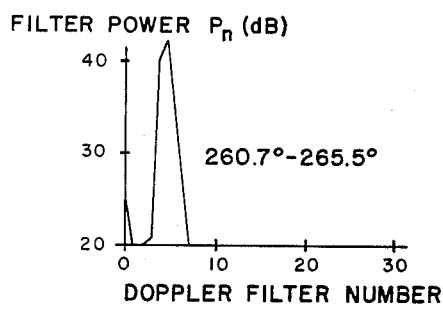
FIG. 6 charts typical radar data for an outbound aircraft.
Figure 6:
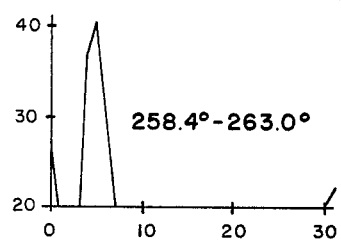
Figure 6:
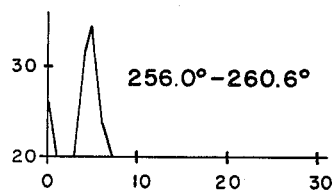
Figure 6:
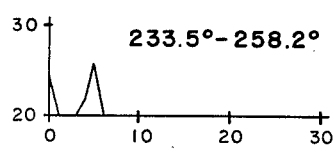

FIG. 6 is the spectrum analyzed coherent data obtained for one scan on an outbound aircraft with a radial velocity of about 230 kts. This target has a spectrum in the second Doppler ambiguous regions (ambiguity interval=200 kts) so therefore folds over into the 30 kt filter (i.e., filter number 5). Actual range rate was again estimated from $\Delta R/\Delta t$ to compare and resolve the Doppler ambiguity. Notice the spectral purity for this target.

Figure 7:
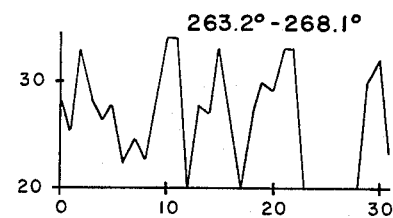
FIG. 7 charts typical radar data for an outbound helicopter.
Figure 7:
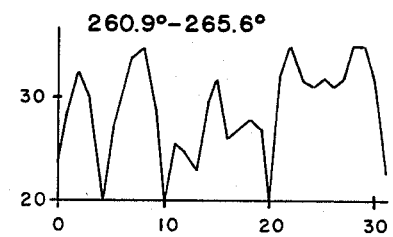
Figure 7:
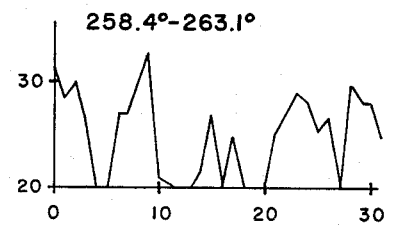

FIG. 7 is the corresponding processed output for an outbound helicopter. Note the multiple filters which are excited with near equal values of $P_n$. This is due to the severe modulation caused by the helicopter blades. Dramatic differences from the aircraft of FIG. 6 are readily apparent. $\Delta R/\Delta t$ indicated a radial rate of 54 kts outbound. That indicates that the true "skin" line is in the filter closest to filter number 10.

Figure 8:
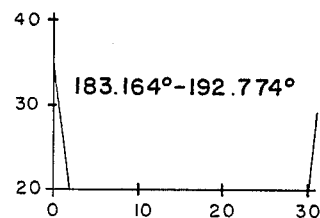
FIG. 8 charts typical radar data for land clutter.
Figure 8:
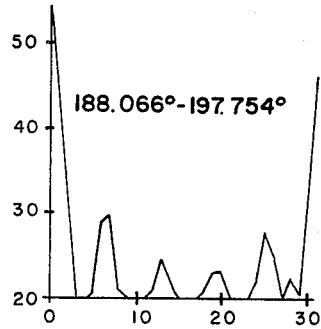
Figure 8:
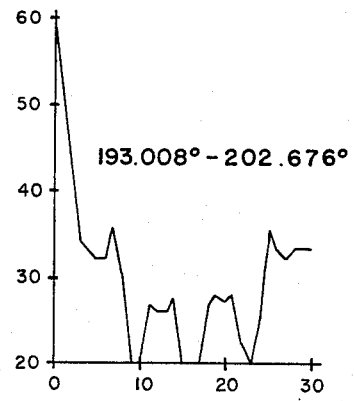

FIG. 8 is the spectrum analyzed coherent data obtained for a single range cell as the antenna scans a land mass. This range cell is 16.75 nm distant from the radar site. The antenna rotation rate was twice as fast for this data so that the bearing extent for a 32 point FFT is now 9.6° instead of 4.8° as in the previously discussed data. The peak response is in the zero Doppler filter as would be anticipated for a stationary radar and target configuration.

Examples of RFI (radio frequency interference) and sea clutter were also analyzed. RFI excited all 32 Doppler filters in many range cells with near equal strength, an anticipated result with broadband interference. Close-in sea clutter was examined, since L-Band backscatter from the sea is low in amplitude, and it exhibited spectral characteristics similar to land clutter.

A method of extracting Doppler data by direct sampling of the radar IF signal has been demonstrated. This technique allows a simpler hardware implementation of Doppler processing for non-coherent radars than has been possible in the past. Performance limitations due to hardware accuracies are adequate to meet many radar processing requirements. Modifications and variations are apparent to one skilled in the art, the scope of the invention's novelty being defined by the appended claims.

What is claimed is:

1. A processor for extracting Doppler data from a noncoherent radar system having a return signal receiver producing an intermediate frequency (IF) signal, the processor comprising:
   one analog to digital (A/D) converter means for converting samples obtained from the IF signal to digital values;
   one sample and hold circuit means connected to said A/D converter means and the return signal receiver, wherein said sample and hold circuit means in response to timing signals precisely phased locked to a transmitted pulse of the radar system samples the IF signal at two points separated by 90 electrical degrees in order to obtain an in-phase (I) data sample and quadrature (Q) data sample, said sample and hold circuit means temporarily holds the I and Q samples and provides the I and Q samples to said A/D converter means;
   moving target indication (MTI) filtering means connected to the A/D converter means for receiving and filtering the digital values representing the I and Q samples output by the A/D converter means;
   timing means connected to the sample and hold circuit means and the A/D converter means and the MTI filtering means, wherein said system timing means provides timing signals precisely phase locked to a transmitted pulse of the radar system to said sample and hold circuit means and said A/D converter means for controlling the sampling and A/D conversion of the IF signal and said timing means provides timing signals precisely phase locked to a transmitted pulse of the radar system to said MTI filtering means for regulating the filtering of the I and Q samples; and
   detector means connected to said timing means for precisely phase locking said timing means to a transmitted pulse of the radar system.

2. A processor according to claim 1, the MTI filtering means comprising first and second MTI filtering means for respectively receiving the I and Q samples.

3. A processor as in claim 2, comprising a transmitter coupled to a local oscillator.

4. A processor according to claim 2, the timing means for controlling the sampling and A/D conversion of the IF signal and regulating the filtering of the I and Q samples said timing means comprising an A/D timing means which is connected to said sample and hold circuit means and said A/D converter means and a system timing means which is connected to said MTI filtering means.

* * * * *